INVENTOR
GUNTHER KAUPERT
WILLY HOMRINGHAUSEN

May 17, 1966 G. KAUPERT ETAL 3,251,319
PROCESS AND APPARATUS FOR THE CONTINUOUS AND SUCCESSIVE
MANUFACTURING OF FIGURINE MOLDS
Filed June 21, 1962 6 Sheets-Sheet 4

INVENTOR
GUNTHER KAUPERT
WILLY HOMRINGHAUSEN

BY Burgess Dinklage & Sprung
ATTORNEYS

May 17, 1966 G. KAUPERT ETAL 3,251,319
PROCESS AND APPARATUS FOR THE CONTINUOUS AND SUCCESSIVE
MANUFACTURING OF FIGURINE MOLDS
Filed June 21, 1962 6 Sheets-Sheet 5

INVENTORS
GUNTHER KAUPERT
WILLY HOMRINGHAUSEN

BY
ATTORNEYS

May 17, 1966 G. KAUPERT ETAL 3,251,319
PROCESS AND APPARATUS FOR THE CONTINUOUS AND SUCCESSIVE
MANUFACTURING OF FIGURINE MOLDS
Filed June 21, 1962 6 Sheets-Sheet 6

INVENTORS
GUNTHER KAUPERT
WILLY HOMRINGHAUSEN

BY
ATTORNEYS

United States Patent Office 3,251,319
Patented May 17, 1966

3,251,319
PROCESS AND APPARATUS FOR THE CONTINUOUS AND SUCCESSIVE MANUFACTURING OF FIGURINE MOLDS
Gunther Kaupert, 1 Thuringer Weg, Erndtebruck, Westphalia, Germany, and Willy Homringhausen, Erndtebruck, Westphalia, Germany; said Homringhausen assignor to said Kaupert
Filed June 21, 1962, Ser. No. 204,283
Claims priority, application Germany, June 27, 1961, K 44,092; Oct. 11, 1961, K 44,902, K 44,903
12 Claims. (Cl. 107—54)

The present invention relates to a process and apparatus for the continuous and successive manufacturing of figurine molds such as those used in the chocolate industry, and more particularly to a process and apparatus for the stepwise manufacture of figurine molds from shapable foil material of low ductility whereby the moldable ingredients, such as chocolate, may be received therein with the foil molds produced serving as packaging for the ingredients.

A method is already known for the manufacture of wrapped and filled pralines, small bars, i.e., chocolate candy bars, etc., and similar filled articles, in accordance with which the filling materials or ingredients are poured into a mold constituting at the same time the outer covering or packaging for the material therewithin. With respect to such method, shallow hollow molds are continuously impressed into an endless strip of tin or aluminum foil, and upon filling and closing these molds, the same are punched out of the metallic strip. Conventional techniques of the foregoing type, therefore, relate only to the forming of comparatively shallow or flat-shaped parts, for which the strip which serves as the mold and packaging need only be expanded or extruded to a relatively low degree.

As opposed to the foregoing, the known procedures are unsuccessful insofar as the production of molds is concerned wherein such molds must have an irregular profile and/or relatively deep depressions or peaks. Applying the known techniques to the production of figurine molds having shapes which possess irregular profiles and relatively deep depressions, has been unsuccessful on an industrial scale, since it has been absolutely impossible to impress these relatively complicated figurine shapes into a running strip of foil material continuously or at least in series operation, especially where a plurality of molds are to be impressed at one time into the strip.

It is an object of the present invention to overcome the foregoing drawbacks and to provide a process and apparatus for the step-wise manufacture of figurine molds from shapable foil material of low ductility for the reception of moldable ingredients therein with the foil molds serving as packaging for the ingredients.

Other and further objects of the invention will become apparent from a study of the within specification and accompanying drawings in which:

FIGS. 1 to 6 are schematic views of various steps in the operation cycle for producing shaped molds from foil materials in accordance with the invention, preliminary and finished patrix molds and preliminary and finished complementary matrix molds being used for the desired purpose, FIGS. 7 and 8 are schematic views illustrating the top and bottom portions of the matrix dies of FIGS. 1 to 6, FIG. 13a represents a schematic partial top view of appropriate portions of the embodiment of FIGS. 12 and 13 showing the adjacent relationship between the preliminary matrix die and the finished matrix die.

It has been found in accordance with the invention that a process and apparatus for the step-wise manufacture of figurine molds from shapable foil material of low ductility for the reception of moldable ingredients therein with the foil molds serving as packaging for the ingredients may be provided, wherein irregular profiles and relatively deep depressions may be provided in effective three dimensional relations in the foil material. The process of the invention comprises initially impressing a preliminary shape into a first portion of the area of the foil materials to be mold-impressed with respect to the plane of the foil, next initially impressing a preliminary shape into the remaining portion of said area of the foil material in at least one additional impressing step while maintaining the first portion in fixed preliminary shape disposition, and subsequently impressing a finished shape into both of the foil portions in at least one additional impressing step, the impressing steps being carried out in successive phase ordinal sequence. It will be understood that any suitable foil material may be used for producing the figurine molds in accordance with the invention, such as a shapable foil material of low ductility, and specifically a metallic foil material including aluminum foil, tin foil, etc.

Preferably, the foil material is conveyed along a path of travel with the first portion of the area of the foil material to be mold-impressed suitably being the forward portion of said area of such foil material in the direction of travel and with the remaining portion of said area being the rearward portion of the area of the foil material in said direction of travel. In accordance with one embodiment of the invention, the initial impressing of the preliminary shape into the remaining porton and the subsequent impressing of the finished shape into both of the foil portions are each carried out in a single impressing step.

Conveniently, two corresponding congruent finished shape mold areas may be placed in opposing abutting disposition along their adjacent edge portions to form a pair of fillable mold halves so that at least one moldable ingredient, such as chocolate, may be introduced therebetween. Once the moldable ingredient has been added, the edge portions of the mold halves may be sealably connected to form a seam therealong. The sealable connection may be carried out in any convenient manner, such as by welding the edge portions together or by mechanically crimping said edge portions together in tight abutment.

Preferably, the mold areas are simultaneously severed from the corresponding foil material, after the mold halves have been filled, by punching out the filled mold halves along the edge portions thereof leaving a predetermined width seam serving as a safety flange for the resulting foil packaging of the filled ingredient.

In accordance with a preferred embodiment of the invention, the perimeter outline or profile of the resulting packaging is calibrated by passing the packaging along a calibration path in a plane perpendicular to the direction of such calibration path and through an outwardly limiting perimeter abutment zone for inwardly pressing the safety flange towards the center of the packaging during passage of the packaging therethrough.

More specifically, the process of the invention relates to the continuous step-wise manufacture of figurine molds from shapable metallic foil material of low ductility in the form of a strip for the reception of moldable ingredients therein with the mold serving as packaging for said ingredients so as to form a filled ingredient packaged article, such process contemplating passing the strip along a path of travel through two successive impressing zones, initially impressing in the first of said zones a preliminary three-dimensional shape into the forward portion in the direction of travel of the area of the strip to be mold-impressed, next initially impressing in the first zone a preliminary three-dimensional shape into the remaining rearward portion of the area of the strip to be mold-impressed while maintaining the forward portion in fixed preliminary three-dimensional shape disposition in said first zone. Subsequently, a finished three-dimensional shape is impressed into both of the foil portions in an additional impressing step in the second of said zones while simultaneously initially impressing in the first zone a preliminary three-dimensional shape into the forward portion in said direction of travel of the next area of the strip to be mold-impressed. The impressing steps are repeated at least one more time and the impressing steps are carried out in successive phase ordinal sequence in said zones.

In accordance with a particular embodiment of the invention, the continuous step-wise manufacture of figurine molds from very thin, shapable metallic foil material of low ductility in the form of a strip for the reception of moldable ingredients therein with opposing mold halves serving as packaging for the ingredients so as to form a filled ingredient packaged article, is contemplated. The steps include passing two opposing strips through separate paths of travel, each strip being passed along its corresponding path through two successive impressing zones for producing mold halves of congruent opposed shape to the shape of the mold halves produced in the other strip, and with respect to each strip initially impressing in a first of said zones preliminary three-dimensional shaping into the forward portion in the direction of travel of a first area of the strip to be mold-impressed, next initially impressing in the first zone preliminary three-dimensional shaping into the remaining rearward portion of said first area of the strip while maintaining the forward portion in fixed preliminary three-dimensional shape disposition in said first zone. Thereafter, the first area is passed to the second of said zones, and a second successive area of the strip to be mold-impressed is passed to said first zone for impressing finished three-dimensional shaping into the preliminary shaped foil portions of the first area in an additional impressing step in said second zone while simultaneously initially impressing in said first zone preliminary three-dimensional shaping into the forward portion in said direction of travel of said second successive area. This is followed by initially impressing in the first zone preliminary three-dimensional shaping into the remaining rearward portion of the second successive area of the strip while maintaining the forward portion of such second successive strip area in fixed preliminary three-dimensional shape disposition in said first zone, and the foil portion of said first area in fixed finished three-dimensional shape in said second zone. Thereafter the first area is passed from the second zone while the second area is passed to the second zone, and a third successive area of the strip to be mold-impressed is passed to the first zone. Subsequently, finished three-dimensional shaping is impressed into the preliminary shaped foil portions of the second area in said second zone while simultaneously preliminary three-dimensional shaping is initially impressed in said first zone into the forward portion of said direction of travel of the third successive area. Then, preliminary three-dimensional shaping is initially impressed in said first zone into the remaining rearward portion of the third successive area of the strip while the forward portion of such third successive strip area is maintained in fixed preliminary three dimensional shaped disposition in said first zone, and the foil portions of said second area are maintained in fixed finished three-dimensional shape in said second zone. The steps in said zones are repeated at least one more time with at least one more successive area of the strip whereby the continuous and successive manufacture of figurine molds from very thin shapable metallic foil material of low ductility will be achieved. The filling, punching, and calibrating steps may be conveniently carried out once the mold halves have been produced.

With respect to the apparatus of the present invention, the same contemplates die stamping apparatus for producing mold halves of the foregoing type which comprises a first support means having adjacently disposed preliminary shape patrix mold means and corresponding finished shape patrix mold means, a second support means having complementary first preliminary shape partial matrix mold means for operatively coacting with part of said preliminary patrix mold means to moldingly engage a foil material portion therebetween, and a third support means having adjacently disposed complementary second preliminary shape partial matrix mold means for operatively coacting with the remaining part of said preliminary patrix mold means to moldingly engage another foil material portion therebetween, and complementary finished shape matrix mold means for operatively coacting with said finished shape patrix mold means to moldingly engage preliminarily stamped foil material therebetween. Significantly, the first and second support means are situated with respect to each other for relative displacement from a position out of contact to a position in foil engaging contact with one another to coact the first preliminary partial matrix mold means with said part of the preliminary patrix mold means for preliminary mold-impressing of a part of shapable foil material therebetween, while the first and third support means are situated with respect to each other for relaive displacement from a position out of contact to a position into foil engaging contact with each other to coact said second preliminary partial marix mold means with said remaining part of the preliminary patrix mold means for preliminary mold-impressing of the remaining part of the shapable foil material therebetween and to coact said finished matrix mold means with said finished patrix mold means for finished mold-impressing of preliminary shaped foil material therebetween, the second and third support means being situated for displacement with respect to said first support means independently of each other.

Preferably, the first and second preliminary partial matrices are situated in vertically displaceable cooperating abutting relation and together define the entire complementary composite matrix mold means for said preliminary patrix mold means. The profile line of separation between the first and second preliminary partial matrices is defined along the line of maximum height of the preliminary patrix mold means in accordance with one embodiment of the invention, and the first and second preliminary partial matrices each define about half of the composite matrix mold means.

In accordance with one feature of the invention, all of the matrix mold means are provided with a smooth plastic lining capable of withstanding the impressing forces for mold-impressing shapable foil material of low ductility, whereby frictional forces occasioned by the molding process will be kept to a minimum.

With respect to the apparatus for retaining and manipulating filled opposing mold halves which are defined in a sheet made of shapable foil material of low ductility with both of the sheets in abutting disposition, a support plate or sorting plate having a retaining surface is provided which possesses depressions therein substantially coextensive with the shape of the mold halves to be retained, such retaining surface also possessing a continuous outline groove therein surrounding the perimeter of each depression and outwardly spaced therefrom a predetermined distance. Furthermore, a coacting punch having a continuous blade coextensive in shape and size with the groove and movable into and out of said groove is provided, whereby filled opposing mold halves in abutting sheets of foil material may be placed on the retaining surface of the sorting plate with the mold halves positioned in the depression and the punch blade may be moved into the groove to punch out the respective mold halves from the sheets for producing separate packagings of filled opposed mold halves with an edge flange substantially equal to the predetermined distance between the groove and depression perimeter. Suitably, the depressions are provided with means defining openings therethrough to the opposing surface of the sorting plate for receiving from the direction of the opposing surface of the sorting plate, urging means for forcing packagings of filled opposed mold halves from the depressions. This is carried out in accordance with the calibrating step. Thus, a calibrating plate may be used in combination with the sorting plate. The construction in question contemplates a calibrating plate having means defining an outwardly limited opening therethrough substantially coextensive in shape with the groove of the retaining surface and slightly smaller in size than said groove, the groove and calibrating plate being movable into and out of axial alignment with respect to each other, whereby when the groove and calibrating plate are in axial alignment, the packagings may be forced by the urging means from the depressions and through the calibrating plate opening to displace the edge flange of the packaging inwardly toward the center of the packaging by contact of such flange with the calibrating plate opening means. The packaging following this manipulation is ready for sale.

Alternately, the opening of the calibrating plate may be lined with a resilient material for abutting the flange portion of the packaging passing therethrough, such material including rubber, elastic, plastic materials and even bristles radially inwardly disposed and projecting a slight distance into the calibrating plate opening to brush the flange portion of the packaging in the desired manner. Of course, the resilient material may be disposed on a separate lining plate in abutting and axially aligned disposition with the calibrating plate.

Referring to the drawings, FIG. 1 to 6 show an arrangement for mold impressing a foil strip 5 passing along a path of travel from left to right as viewed in these figures. A first support means 6 is stationarily positioned with the preliminary patrix 1 and the finshed patrix 11 thereon in successive ordinal sequence. Located in vertical alignment thereabove are the preliminary matrix 2 having a suitably shaped concave surface 10 and the finished matrix 4 having a suitably shaped concave surface 7. Matrix 2 is carried by the vertically displaceable support 12 while matrix 4 is suitably carried by the displaceable support 8. Shaft 9, connected at its lower end to support 8, is concentrically disposed within hollow shaft 14, the latter being connected at its lower end to support 12. Shafts 9 and 14 are suitably connected by means (not shown) for vertical displacement in the direction of the arrows shown in FIG. 1, either together or independently of one another, for bringing matrix 2 into contact with a given portion of foil material in coaction with patrix 1 and matrix 4 into contact with a given portion of foil material in coaction with patrix 11 in the desired ordinal sequence.

Figures 1, 2, 3, 13A, 14B:
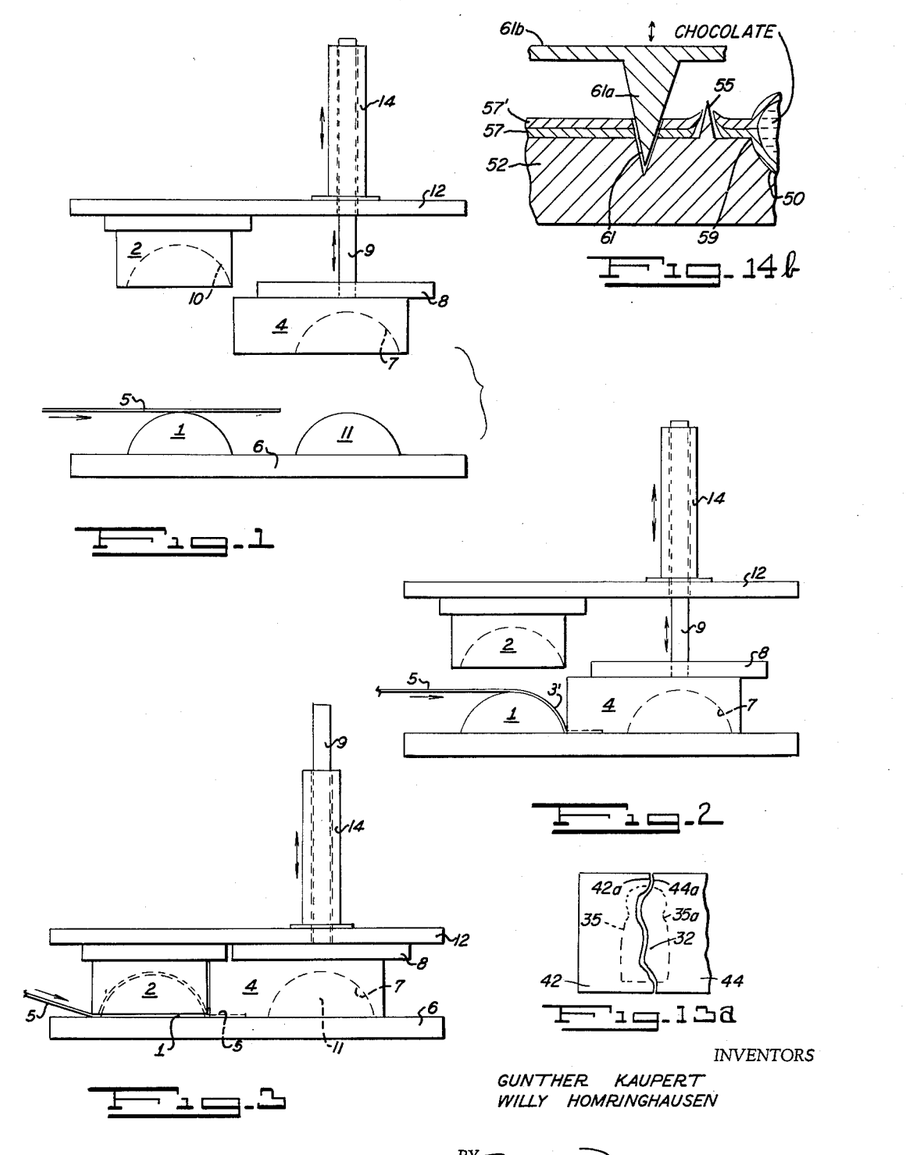
Figure 4:
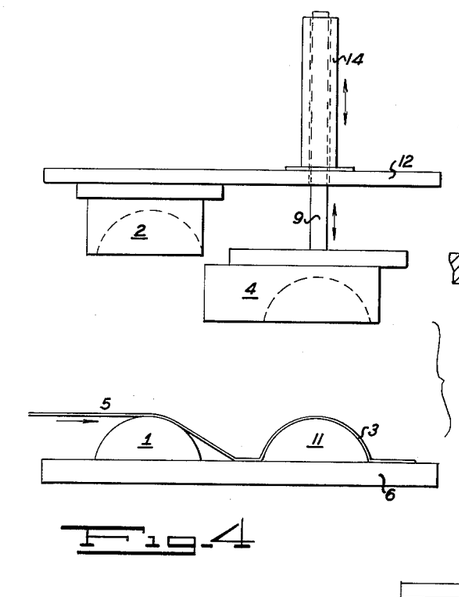
Figure 5:
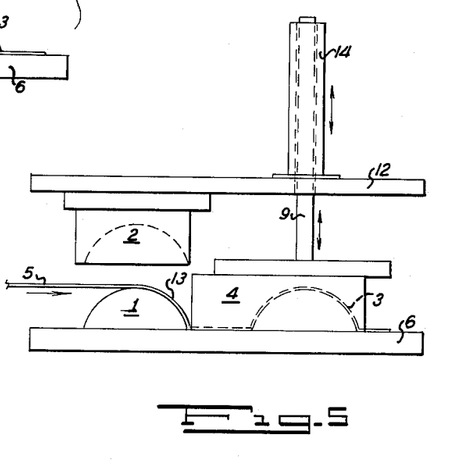
Figure 6:
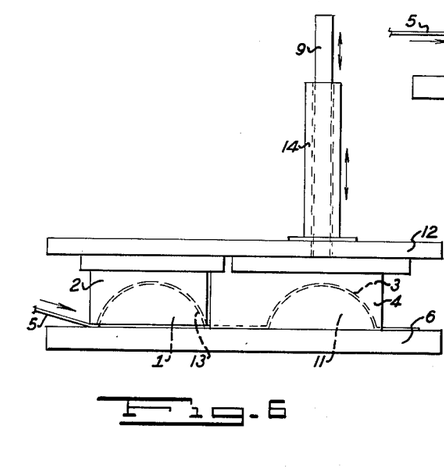

In operation, the metallic foil 5, such as aluminum foil of low ductility and of very thin gauge, suitable for packaging chocolate figurines, is passed over the patrix 1 so that its forward end extends slightly under the rearward or trailing edge of matrix 4. In FIG. 2, shaft 9 has been downwardly displaced to cause matrix 4 to engage along its trailing edge the forward edge of the foil 5, thereby displacing such foil downwardly around the forward half of the preliminary patrix 1 as shown at 3' in FIG. 2. The next step is shown in FIG. 3 wherein hollow shaft 14 has been downwardly displaced to bring matrix 2 in engagement with the foil at patrix 1 to mold-impress a preliminary shape into the foil 5. These steps take place with sufficient self-feeding of the foil material, as for example from a storage roll (not shown), to enhance creasing, gathering and crimping thereof, e.g., longitudinally, transversely and peripherally, to achieve the preliminary shape. At this point, as shown in FIG. 4, the matrices 2 and 4 are withdrawn from engagement with the molded foil portions at the respective patrices and the preliminary shaped mold 3 is passed from the patrix 1 to the patrix 11 for finished mold-impressing, whereupon the creased and crimped portions of the preliminary shaped foil throughout the area being preliminarily mold-impressed provide an expansion reserve in the foil to achieve the desired finished mold with the irregular 3-dimensional shaping sought. At the same time, a further portion of foil 5 is brought over the patrix 1 by further self feeding. FIG. 5 shows the next step where matrix 4 is lowered into engagement with the preliminary shaped mold 3 to impress the same to finished condition, i.e. including the entire area thereof around patrix 11, longitudinally, transversely and peripherally, and simultaneously to engage the forward portion of the next area of the strip 5 for bringing the same by sufficient self feeding into preliminary alignment over the forward half of patrix 1, such second area being designated at 13. As may be seen in FIGURE 6, while matrix 4 remains in contact with the foil at patrix 11, matrix 2 is lowered into contact with the foil at partix 1 to impart the preliminary mold-impression to the area 13 while taking up further foil around the rearward half of patrix 1 during the descent of matrix 2 through further sufficient self-feeding to enhance creasing, gathering and crimping thereof for achieving the desired preliminary shape thereat. When this has been achieved, the matrices 2 and 4 are withdrawn and the second area 13 is placed over the patrix 11 while the first area 2 is removed from the range of the dies. The cycle may then be repeated so that each time a finished mold-impression may be imparted to one area of the foil and at the same time a partial impression to the next area, whereupon the remainder of the impression for the preliminary mold-impression step of such area may be carried out.

Figure 7:
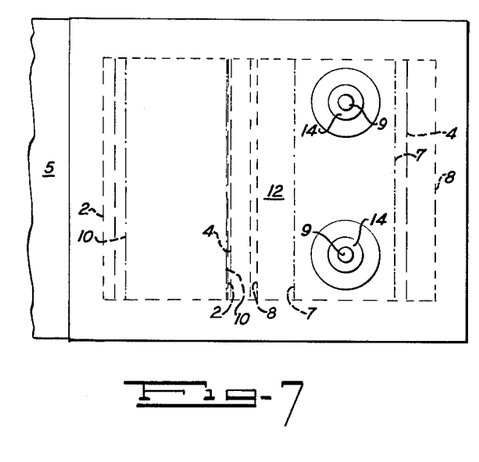
Figures 8, 10B, 10C, 10D, 10E, 10F, 10G, 10H:
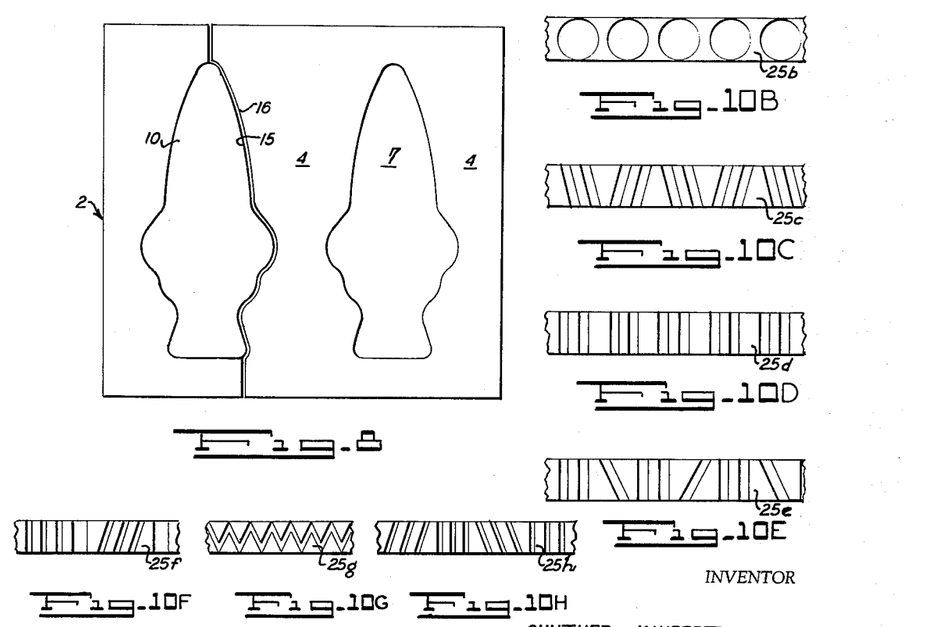

In FIG. 7, a top view of the apparatus of FIGS. 1-6 is illustrated wherein it is seen that for greater stability and accuracy, a pair of shafts 9 and hollow shaft 14 are provided in concentric relation so that even distribution of the moving forces may be achieved. In FIG. 8, the underside of the matrices 2 and 4 are shown wherein it is clear that an irregular profile line of separation is provided between the leading edge of matrix 2 and the trailing edge of matrix 4. These matrices are so provided in vertical alignment that the profile 15 of matrix 2 and the profile 16 of matrix 4 are in close alignment with one another to provide together a suitable composite preliminary matrix mold means.

While the support 6 has been shown to be stationary and the supports 8 and 12 have been shown to be vertically displaceable with respect thereto independently of each other, it is also possible in accordance with the invention to provide support 6 as displaceable as well, and if desired providing either support 8 or support 12 as a stationary support with the remaining two supports being situated for relative displacement to achieve the sequence of engagements and disengagements with foil portions between the various matrices and patrices in accordance with the invention.

Figure 9:
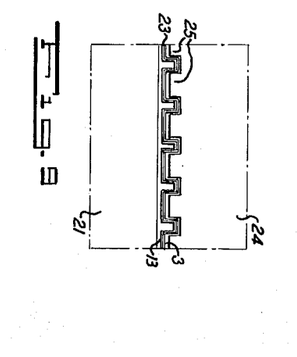
FIG. 9 is a schematic sectional view showing one manner of crimping abutting edge portions of the shaped foil molds to connect the same together, FIGS. 10A to 10H schematically illustrate various crimping dies for achieving different designs in the edges of the foil molds, FIG. 11 schematically illustrates a filled foil mold packaging with the adjacent edges of the foil being crimped together with a particular design, FIG. 12 and FIG. 13 schematically illustrate an alternate embodiment for the matrix dies in accordance with the invention.
Figure 10A:
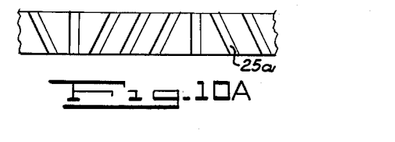
Figure 11:
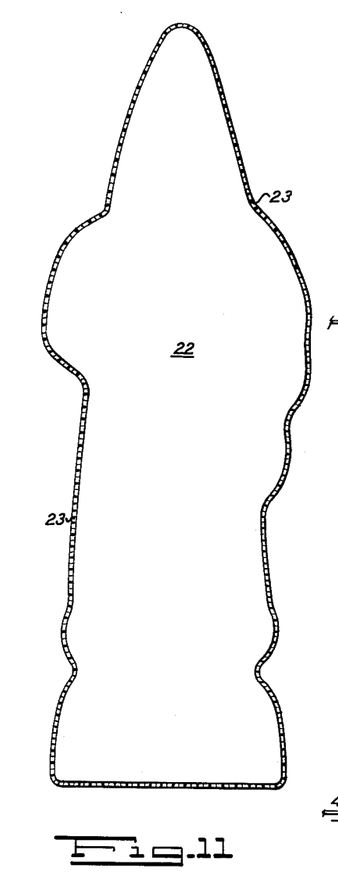

In FIG. 9, a support 21 is provided on which may be placed the edge flange of the filled packaging so that such flange may be suitably crimped to interconnect the abutting edge portions of the foil mold halves. Thus, the shaped foil halves 3 and 13 are disposed in abutting relation on the surface of support 21 whereupon the stamp 24 having the projections 25 may be brought down against the abutting edge portions of the foil to produce crimping to form a connected flange portion 23. In FIGS. 10A-10H stamps 25a through 25h are shown which indicate the variations in design of the projections which may be provided for imparting different kinds of crimping for the flange 23. FIG. 11 illustrates the packaging containing the filled ingredients with the foil mold halves connected together along their common edge portions by means of a crimped flange 23. The packaging 22 may contain chocolate, for example, having an irregular profile with deep depressions corresponding to the shape and profile of the mold halves produced.

Figure 12:
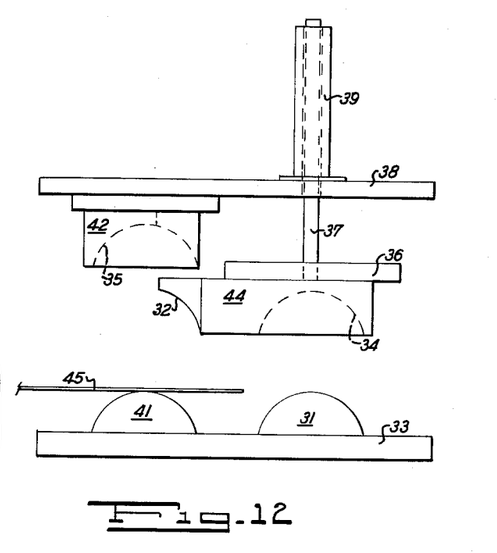
Figure 13:
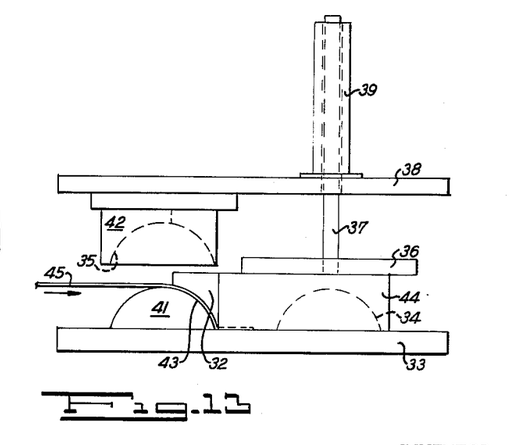

In FIGS. 12 and 13, an alternate embodiment is shown in which a stationary support 33 is provided with a preliminary patrix 41 and a finished patrix 31 with the foil 45 passing from left to right as viewed in FIG. 12. The preliminary matrix 42 is provided with the concave surface 35 and is carried by the vertically displaceable support 38 attached to the hollow shaft 39. On the other hand, the finished matrix 44, having the concave surface 34 is secured to the support 36 which is rendered vertically displaceable by reason of shaft 37 concentrically disposed within hollow shaft 39, both said shafts being displaceable independently of one another by means not shown. The trailing edge of matrix 44 is provided with a preliminary matrix portion or projecture 32 which may cover over and moldingly coact with a part of the foil at the forward portion of the patrix 41 as shown in FIG. 12. In this case, when support 36 is lowered toward support 33, matrix 44 engages the forward portion of foil 45 in the same manner as in the embodiment illustrated in FIGS. 1-6, but also by reason of the trailing preliminary matrix portion 32, a more detailed preliminary partial impressing of a part of the forward portion of foil 45 may be carried out with respect to patrix 41. Thereafter, support 38 may be lowered to bring matrix 42 into molding coaction with the remainder of patrix 41 to preliminary impress the remainder of the foil area disposed at patrix 41. This embodiment finds unusual advantage where extremely irregular profiles and deep depressions are present in the figurine molds to be made, so that a more effective preliminary impression in three stages may be achieved. Specifically, the forward portion of the foil 45 is preliminary impressed by the matrix 32, secondly, the remaining portion of the area of foil 45 in question is preliminary impressed by matrix 42, and thirdly, when the preliminary mold form is placed upon patrix 31, the matrix 44 will impress the finished shape into the mold half in question. At the same time, the preliminary matrix portion 32 will coact with the forward portion of the patrix 41 to start the next cycle for the preliminary impressing of the next area of foil 45 at patrix 41. As will be appreciated from FIG. 13a, which represents a top view of appropriate portions of the preliminary matrix 42 and the finished matrix 44, the preliminary concave surface 35 only represents a part of the total shaping to be impressed upon the foil in the preliminary step. The remainder thereof is represented on the underside of the projecture 32 of finish matrix 44 as shown schematically at 35a. The forward irregular edge 42a of matrix 42 is adjacent and coextensive with the corresponding trailing edge 44a of matrix 44 and such trailing edge 44a defines the rearwardmost limit of the projecture 32 of matrix 44. The forward portion of matrix 44 is omitted, and a comparison with FIGS. 12 and 13 will indicate that the finished concave surface 34 of finished matrix 44 is positioned just to the right of the broken away portion as viewed in FIG. 13a. By way of this alternative embodiment, intricately shaped mold impressions in comparatively thin, nonductile foil may be made, without tearing the foil, due to the fact that the forward portion of the foil is brought downwardly against the forward portion of patrix 41 during the descent of matrix 44 as the projecture 32 engages such foil (see FIGS. 12 and 13), whereupon the preliminary matrix 42 in turn may descend upon the remainder of patrix 41 and cause the enveloping of such remaining portion of patrix 41 with the sufficient feeding of the foil 45, as for example from a storage roll (not shown). Since the overall mold impressing of the preliminary shape into the foil 45 is carried out in two separate preliminary steps with suitable sufficient feeding of the foil, without tension or drawing, all of the intricate shapes, depressions, raised portions, etc., may be suitably imparted to the foil area in question with attendant creasing, gathering and crimping of the foil. Accordingly, when the finished shape is to be impressed in this foil area, adequate expansion reserve is available in the preliminary shaped area by reason of the creasing, gathering and crimping to enable the finished shape to be achieved with similar avoidance of tearing or drawing of the non-ductile foil. As compared with the construction of FIG. 8 for instance, that provided by FIG. 13a permits more intricate details to be mold-impressed into a foil area due to the presence of the projecture 32, as for example extending in a rearward direction over the forward portion of patrix 41 to achieve a line of culmination points at maximum height which is defined by the more or less contiguous edges 42a and 44a. Therefore, by providing a first preliminary mold impressing of a first portion of a foil area by matrix 44 and a second preliminary mold impressing of the second or remaining portion of such foil area by matrix 42, such that the line of separation between the two matrix mold portions, i.e., matrix 42 and projecture 32 of matrix 44, is at the maximum height of the mold shape to be impressed in the foil, such mold shape will be in the desirable form with such creasing, gathering and crimping throughout the extent thereof to permit the final mold impressing step to be carried out, using the expansion reserve created in the foil area, and an accurately reproduced mold shape will be attained which will be commercially attractive and which will in turn insure an equally commercially attractive solid molded ingredient therewithin, as for example in the case of a chocolate filling molded within opposed mold halves of foil.

Figure 14:
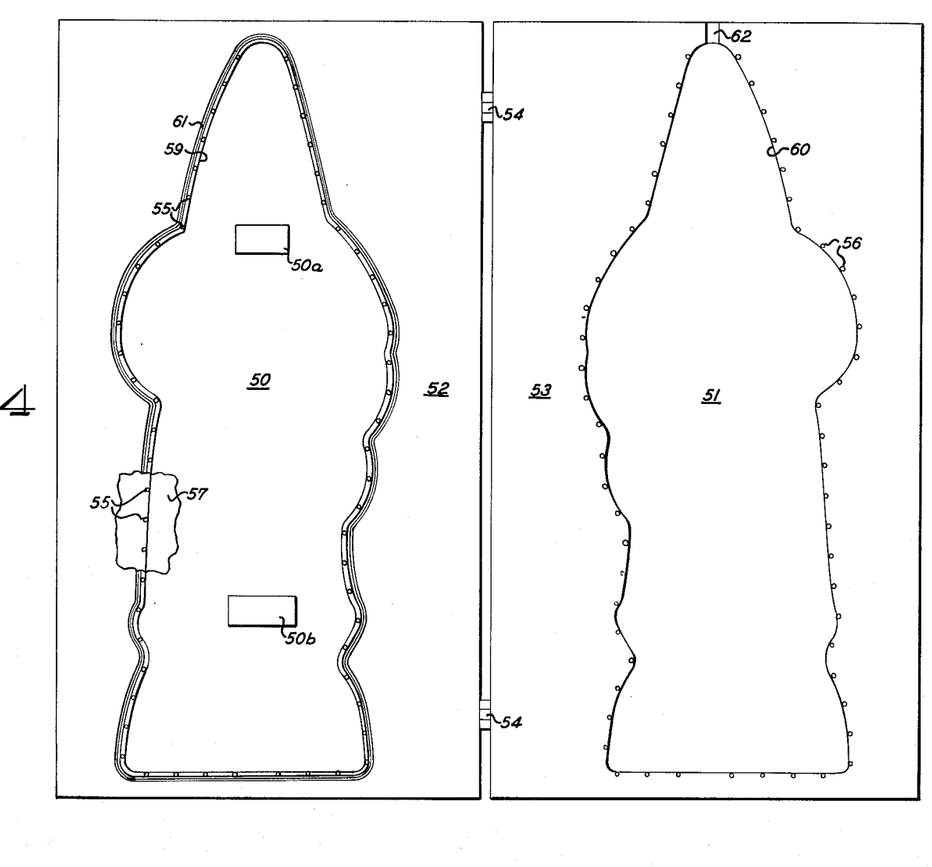
FIG. 14 illustrates schematically a portion of a hinged support plate or sorting plate for filling the foil molds, for severing the filled packaging from the remaining portion of the foil material, and for maintaining the packagings in suitable disposition for further treatment, FIG. 14a schematically illustrates a partial section of the sorting plate of FIG. 14 in a direction normal to the plane of said figure, FIG. 14b schematically illustrates a partial section of the sorting plate of FIG. 14 containing filled mold halves which are being punched out to form prewrapped filled packages.

In FIG. 14, a hinged support plate or sorting plate is shown containing the sorting plate elements 52 and 53 pivotally connected by means of the hinges 54. A mold depression 50 is provided in plate element 52 and a mold depression 51 is provided in plate element 53, such mold depressions conforming to the configuration of the mold halves of the areas of the foil impressed with the desired figurine mold shape. The outer perimeter of the mold depression 50 is shown at 59 while the outer perimeter corresponding thereto of the mold depression 51 is shown at 60. Spaced from the outer perimeter 59 of mold depression 50 is situated a groove 61 so that a predetermined distance exists between the groove 61 and the outer perimeter 59 of the mold depression 50. A plurality of pins 55, or the like, are disposed on plate element 52 between the groove 61 and the outer perimeter 59 while corresponding recesses 56 are provided in plate element 53 along the perimeter outline 60 of mold depression 51. Thus, all the areas of the foil in question which are mold impressed with the figurine shape desired may be placed on the sorting plate with the mold impressions correspondingly positioned in the mold depressions 50, 51 of the sorting plate in question. In this embodiment, the mold halves in the foil which will be placed in the mold depressions 50 and 51 will be mirror images of one another so that upon bringing the sorting plate elements 52, 53 into abutting contact with one another by pivoting the same about hinges 54, 54, a suitable mold will be provided whereby the moldable ingredients, such as chocolate, may be poured into the mold container thereby formed through the channel 62 provided in sorting plate element 53.

In order to assure a suitable connection between the mold halves of the foil forming the packaging for the moldable ingredients, pins 55 serve to retain, along their extent, the foil portion thereat as indicated by the partial showing of a foil 57, already mold-impressed and having its edge portion punctured by the pins 55 so as to hold such edge portion in comparatively fixed disposition. Of course, upon closing sorting plate element 53 onto sorting plate element 52, pins 55 also will pass through the foil edge portion extending over the recesses 56 in plate 53 so that prior to the filling of the mold, the mold halves in question will be in tight-connected disposition along their abutting portions.

Figure 14A:
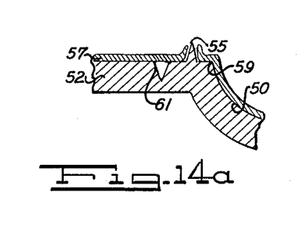

FIG. 14a illustrates a partial schematic sectional view of a portion of the sorting plate element 52 as seen in transverse cross section, the foil 57 extending across the groove 61, over the edge 59 of the mold depression 50 and into the mold depression, with the edge portion being secured in place by reason of pins 55 perforating the foil 57 along the flange portion between edge 59 and groove 61.

Once the filling has taken place, the sorting plate may be subjected to any convenient work-up operation, such as spinning, in order to evenly distribute the chocolate or other moldable ingredient within the mold so as to avoid dead spaces and air pockets. Upon opening the sorting plate with the filled packaging disposed on sorting plate element 52, such sorting plate may be placed in alignment with a punching device 61b having a punching blade 61a of identical configuration and size as that of the groove 61 (see FIG. 14b). In this manner, the plate element 52 may be positioned in axial alignment with the punching blade 61a and the punching blade displaced toward the plate element 52 until such blade enters the groove 61 to an extent sufficient to cause the cutting of the foil 57 as well as the foil 57′ (previously disposed on element 53) of the filled packaging from the remainder of the corresponding foil disposed on the sorting plate, the punching device 61b moving vertically in the direction of the arrow shown in FIG. 14b. It will be seen in FIG. 14b that the foil 57′ previously disposed on plate element 53 has been punctured by pins 55 so as to intermesh with the punctured portions of foil 57 to connect tightly these foil halves, and that the hollow mold which results has been filled, for instance, with chocolate.

Since the opposing mold halves have already been connected together in sealed disposition by reason of the pins 55 and the recesses 56, a finished package is obtained having a flange of predetermined width determined by the distance between the groove 61 and the perimeter outline 59 of the plate element 52. Once the packaging has been punched from the foil, the same may be readily removed.

Figure 15:
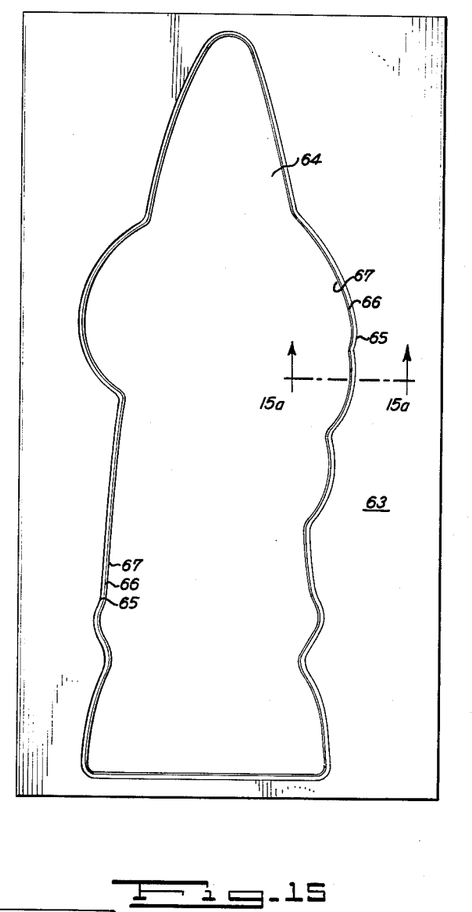
FIG. 15 is a schematic illustration of a portion of a calibrating plate used for turning in the edge flange of the packaging to improve the appearance and stability of the connection between the opposing foil molds.

In this connection, it may be desirable to calibrate the filled packaging for control of the exact size and shape of the articles produced, and for this purpose, as shown in FIG. 15, a calibrating plate 63 is provided, which may be disposed, for example, in vertical disposition. Calibrating plate 63 is provided with an opening 64. The opening 64 converges slightly from the forward side to the rearward side of calibrating plate 63, such that the forward side is provided with an edge 65 whereas the rearward side is provided with an edge 66, slightly smaller in size than the edge 65. The opening 64, defined by the edges 65 and 66, corresponds in size and configuration with the molded, filled, and packaged articles produced in the above-described manner. The sorting plate, in question, such as that of FIG. 14, may be passed along a path in axial alignment with the calibrating plate 63 such that the molded and filled article disposed on the sorting plate is in alignment with the opening 64. By means of suitable thrust means (not shown) having thrust pads 50a and 50b which are provided in suitable openings of sorting plate element 52, the filled article may be thrust from the mold depression 50 and forced through the calibrating opening 64. The thrust pads 50a and 50b are provided with surfaces which coincide with the configuration of the mold half disposed in the mold depression 50 so that the shape of the finished article will not be adversely affected and so that a suitable gripping of the article by the pads 50a and 50b will occur for the passage of the article through the calibrating opening 64 of plate 63. (See FIG. 14.)

The foregoing action causes the flange extending around the perimeter of the filled article to bend rearwardly and inwardly with respect to the axis of the article so as to complete the sealing disposition of the flange portion and to improve the configuration and silhouette of the finished packaging.

Figure 15A:
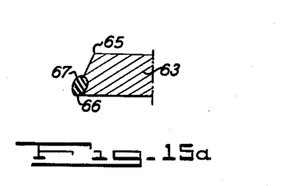
FIG. 15a is a schematic enlarged partial sectional view of the calibrating plate of FIG. 15, taken along the line 15a—15a, FIGS. 15b, 15c, and 15d are schematic enlarged partial sectional views similar to that of FIG. 15a, each showing an alternate embodiment for providing the calibrating plate with resiliently outwardly limiting perimeter abutment means.

In order to avoid any undue binding yet ensure the desired action, the opening 64 of the calibrating plate 63 may be lined with a suitable resilient material 67, especially along the rearward edge 66. As may be seen in FIG. 15a, the resilient material, such as rubber, is disposed in the form of a band along a portion of the inner surface of the plate 63 forming the opening 64.

Figure 15B:
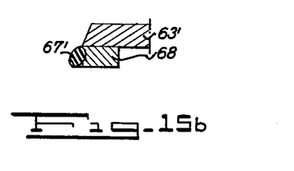

In FIG. 15b, an alternate embodiment is shown in which the calibrating plate 63′ is backed by a metal plate 68 on which is disposed the band 67′ of resilient material extending slightly into the opening of the calibrating plate.

Figure 15C:
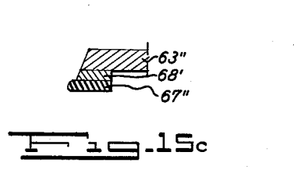

In FIG. 15c, another embodiment is shown in which the calibrating plate 63″ is backed by a combined plate containing a rubber layer 67″ disposed against a metal plate 68′ in such a manner that the inner edge of the rubber plate 67″ is extending inwardly beyond the corresponding edge of the metal plate 68′ so that the desired resilient abutment between the calibrating plate and the flange of the article may take place effectively.

Figure 15D:
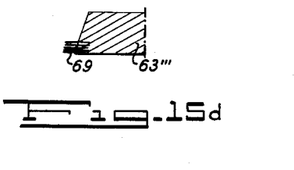

In FIG. 15d, the resilient lining of the opening of the calibrating plate 63‴ is defined by bristles 69 forming a brush edge against which the flange of the article passes so that the desired inward displacement of the flange edge is carried out.

Therefore, it is seen that the invention concerns not only a process but a suitable apparatus for the continuous or successive manufacturing of figurine molds for containing molded figures, etc., of meltable or moldable ingredients, such as food, candy, i.e., chocolate, etc., wherein such molds are provided in a strip or in series disposition. The foil material used, of course, is one having low ductility, such as a thin aluminum or tin foil, so that the foil mold may remain on the ingredients as packaging therefor. Molds made from thin foils of the foregoing type are distinguished from the usual molds which are made from various materials insofar as the mold shape to be imparted to the foil in accordance with the invention is achieved by a step-like or graduated process wherein the initial step or cycle results in the formation of only an initial or preliminary shape while the subsequent stage or stages lead to the finished mold-impressed article for containing the goods. While heretofore molds were produced in which the metal sheets serving as the mold halves were stamped or punched in the conventional manner so that the material became stretched or extruded, this was only possible since the metal sheets used were sufficiently thick to permit the required change of shape through changes in the cross-sectional thickness of various portions of the metal sheet. Pressure pads were used to prevent the formation of unevenness, creases or waves in the stamped, pressed, or extruded material, and the use of these expedients has been considered necessary up to now where molds are made from metal sheets. In direct contrast thereto, in accordance with the invention, the mold shaping or impressing of metal sheets is carried out in an entirely different way, using thin foils, films, or sheets of shapable material of low ductility, such as metallic material, the desired shape being imparted to the article despite the fact that the foil material used contains hardly any reserve characteristics to enable sufficient stretching to take place to provide the desired three dimensional shape. On the other hand, by sufficiently feeding the foil material in a series of steps so that only a preliminary shape will be imparted to the foil in the first step, the lack of ductility characteristics in the foil does not prevent the desired mold-impressing to occur. In fact, while unevenness, creasing, or corrugating of the mold sheet had always been avoided in the past, using low ductility foil materials in accordance with the invention presupposes the creasing or crimping of the foil strip so that tearing of the foil will be avoided yet the desired detailed three dimensional shape will be imparted to the foil for the desired purpose. Naturally, the above-noted known operation for producing mold halves of suitable shapes could not be applied to the packaging field since the mold must serve simultaneously as the packaging for the filled article, yet be attractive in appearance and easily removed from the filled ingredients, as for example in the case of a candy bar wrapped in metallic foil.

In accordance with the preferred embodiment of the invention, the prototype or initial form is impressed in the first phase while the finished shape is formed in the second or subsequent phases, preferably, only those mold halves being pre-stamped in the first phase which are disposed rearwardly in the forward motion of the foil strip through the various phases, so that in the subsequent phase or phases, the remaining halves of the figures to be mold impressed may be so treated at a point forward of such first phase. In this manner, figurine molds from aluminum or tin foil may be prepared on a large scale in series with opposing mold halves being impressed desirably in the same foil strip next to one another. Where the mold halves are irregular in shape, separate mold stamping equipment will be required for producing each mold half, but such equipment may be disposed in adjacent relationship with the opposing mold halves being impressed in preliminary stages at the same time, if desired, and impressed in the finished stages also at the same time, if desired. For best results, of course, the surfaces of the matrices and patrices of the stamping equipment used to form the mold halves are provided with highly smooth surfaces to avoid friction and to impart precise shapes to the foil material. Naturally, the material must be sufficiently fed as aforesaid to prevent tearing since the material in question is low ductile material.

By reason of the construction of the initial and finished mold stamping means adjacent one another, the functional concordance of the finishing stamp may be such that the same serves to hold the incoming foil strip so that the preliminary stamp may be operated to impart the desired impression to such strip. Depending upon the difficulty of the profiles and the irregularity and deepness of the depressions to be made, it may be of particular advantage to distribute the finishing impression of the foils over two or more finishing stamps. Nevertheless, by holding the incoming strip, the second stamp serves to initially impress a portion of the foil material even before the main preliminary or initial stamping step. The stamping operations, of course, work in alternate phases so that the material which has been preliminarily stamped may be passed to the next stage for the finishing stamp operation.

The use of two or more stamping dies is of especial importance where a precise fixing of the shapes of the two mold halves, true to the image and figure desired, is necessary. The third and any further stamping dies may be used in this connection for fixing the exact position of the single forms and shapes in the strip. As aforesaid, the foil strip during all of the stamping operations is practically never exposed to tension or drawing, but rather only to a creasing or corrugating action, due to the feeding of sufficient foil material to provide the desired shape despite the low ductility of the foil material in question. This is accomplished as for example by self-feeding of the foil from a storage roll in a sufficient amount to cover the preliminary patrix without drawing or tension of the foil whereupon, once the preliminary shape is impressed with accompanying creasing, gathering and crimping, the final mold shape may be imparted in the next step using the expansion reserve in the foil occasioned by such creasing, gathering and crimping to again avoid tension or drawing of the foil. The significance of the present invention may be readily appreciated from the fact that figurines are to be produced which, as a rule, are very irregular and varied in design, often to an extent that the same do not possess a readily developable or easily shapable surface. This is especially true where three dimensional shapes are contemplated which contain strong or high projections and only slight bulging in adjacent areas of the mold where the low ductility of the foil would present the problem of potential tearing of the foil during the stamping of such intricate parts.

The stamping dies of the embodiment of FIGS. 12 and 13 more readily permit a perfect and tearless form to be achieved in the stamping operation, whereby in the first or rough stamping step, a preliminary initial stamping may be carried out when the second or finishing stamp is moved to the desired position for holding the incoming foil for the rough stamping operation to take place. Appropriately, up to one half of the mold to be impressed may be roughly stamped by the second or finishing stamp by reason of the projection to the rough stamp carried thereby but also the various heights of the three dimensional shape of the figurine to be formed above the separating line are initially impressed.

In this regard, it is useful to provide the projecture of the second step or portion overlying the first die (see part 32 of FIGS. 12 and 13 for instance) in a manner that the same embraces roughly that half of the die patrix which is adjacent the second stamp in the direction of travel of the foil, whereby the edge of line of culmination points for attaining full development of the figurine half may define the separating line between the first stamp and the projecture of the second stamp. Moreover, it is advantageous for the projecture of the second stamp to include those parts of the shape which are particularly sloping in nature with respect to the general cross-section, whereby in subsequent impressing stages unduly large graduations need not be encountered or overcome. Essentially, the present invention contemplates selecting the individual stamping stages in such a way that all tension and tendency to tearing of the foil are retarded and avoided even though a substantially continuous successive stamping operation is carried out. Naturally, the provision that all of the stamping dies be provided with surfaces free from even the slightest frictional contact points serves to ensure the desired operation without tearing of the foil. The stamping dies may thus be coated with a layer of thermoplastic film which is resistant to the strain of the stamping action yet provides as smooth a surface as possible for the thin, low ductile metallic foil in question.

Generally, where a continuous strip of mold halves is manufactured by the stamping action, a pair of such strips provided with corresponding mold halves may be filled with the substance to be molded and conveyed through a subsequent sealing apparatus wherein the foil strips are joined mechanically or by means of welding with a suitable welding substance or adhesive along the contours of the outer edges of the figurine shapes. Such mechanical joining may be realized, for instance, by means of calking, i.e., to tighten the edges by driving portions of one edge into the surface of the other. In this connection, a specific hinged support frame may be used in which the molds are supported during the filling and distributing operation of the filled mass. Such distributing operation may be carried out, for instance, by spinning the support frame with the hinged portion in abutting relation and the filled mold halves therebetween, so that the generated centrifugal forces will urge the material into all the crevices of the mold halves in question. Needlepoints or projections may be provided on one side of the hinged support frame, as aforesaid, with corresponding recesses on the counterside, whereby when the hinged frame is closed, the edge parts of the foil of one mold half will be pressed into and simultaneously perforate the edge parts of the foil of the other mold half. The needlepoints may be selected, of course, of a suitable length and may be sufficiently short that only the edge parts mesh together in random manner (see FIG. 14b). The needlepoints may take the shape of pins having relatively blunt ends with a square cross-section or a shape of varied design similar to that used for calking the edges together in a mechanical manner as shown in FIGS. 9 and 10A to 10H. After calking, the punching of the filled and packaged figurine molds may be carried out not only one by one, but with a plurality of filled molds in a group using correspondingly shaped and positioned punching blades for this purpose, i.e., in a manner analogous to that shown in FIG. 14b but with a plurality of adjacent depressions in a plate element and a punching apparatus having correspondingly adjacent blades positioned for punching filled mold halves from the foil material layers disposed on the plate element. Once the punching operation has been completed, the individual packaged articles may be passed through the calibrating plate containing an opening of the same cross-section and perimeter shape as that of the individual packaged figurines, i.e., at the separating level between mold halves. Naturally, the dimensions of the calibrating plate opening are such that the forward side toward the figurine being calibrated may be provided with an edge slightly larger than the figurine edge to be embraced whereby the desired bending of the flange edge may be conveniently carried out. While the opening of the calibrating plate inwardly diverges toward the rear face of such plate, the smallest cross-sectional configuration of the calibrating plate will be essentially equal to the cross-section of the figurine plus the thickness of the flange in bended from with a small safety allowance. Upon leaving the calibrating plate, the edges of each individual article will be closely pressed against the figurine packaging (see FIG. 16).

The provision for a resilient lining along the inside edge of the opening in the calibrating plate will serve to provide a substantially perfect adherence of the edges of the foil to the body of the figurine mold, especially where the cross-section of the figurine severely decreases from the separating line between the mold halves rearwardly and/or downwardly. The elastic construction of the narrowest cross-section of the calibrating plate, in the form of a resilient or elastic ring, corresponding to the cross-section of the figure at the separating line between the mold halves, serves the desired purpose. Suitably, the elastic or resilient ring is slightly smaller than the cross-section of the figurine at the separating line whereby the edges are caused to bend backwardly more than 90 degrees so that the same are pressed securely against the figurine. Besides elastic rings of rubber or correspondingly resilient plastic elements, a brush-type ring or similar construction is found to be quite suitable. The selection of the size of the elastic ring will depend, of course, upon the type of foil and the surface of the edge in question, as well as the characteristic shape of the figurine. In this connection, with relatively small edges in a softer foil, and proportionally round figurines, the strain on the elastic ring is less than is the case with harder foil types having larger edges and highly irregular shape characteristics. Where such softer material is used as the foil, a correspondingly softer resilient ring may be provided in the calibrating plate, and correspondingly where a harder foil material is used, the ring will be less resilient. Depending upon the particular dimension of the elastic ring with respect to the cross-section of the figurine, the ring may be used for various purposes, i.e., the variations in the cross-section of the opening defined by the resilient ring in stressed or collapsed position.

Figure 16:
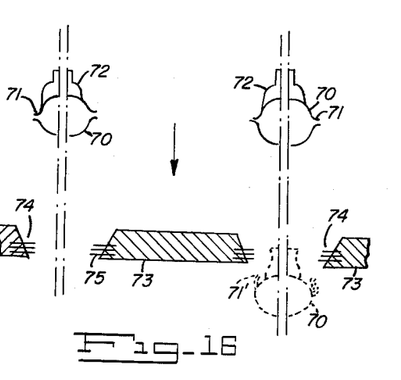
FIG. 16 is a schematic sectional view of the positional relationship of the filled packagings and a calibrating plate for calibrating a plurality of packagings simultaneously.
Figure 17:
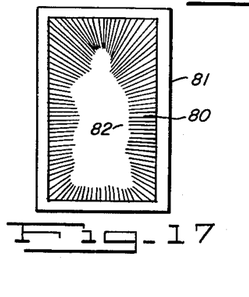
FIG. 17 shows an alternate embodiment of the calibrating apparatus.

It will be appreciated in accordance with the present invention that in addition to a single calibrating plate operation, a plurality of figurine molds may be passed through a plurality of corresponding calibrating plate openings in the form of a multiple operation, as shown in FIG. 16 in which the filled packages 70 having the flange edges 71 are forced in the direction of the arrow by thrust arms 72 through the openings 74 of element 73. Openings 74 are lined with bristles 75 for forcing edges 71 against the packages as shown at 71' in the dot-dash position. The various embodiments of the resilient ring may be provided and where bristles forming the resilient means are concerned, the calibrating plate may be omitted and a bristle brush used with an opening of the desired cross-section for the flanging and pressing in of the edges of the individual articles, as shown in FIG. 17 in which the bristle brush 80 held in frame 81 forms the calibrating opening 82.

Figure 18:
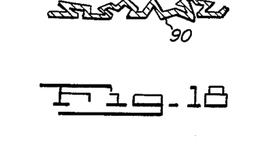
FIG. 18 shows schematically a portion of the foil in section to illustrate the pregathered disposition thereof, whereby to provide desired expansion reserve for the molding steps.

It will occur to the artisan, of course, that the foil material used in accordance with the invention to form the mold halves may be used in pre-gathered or pre-crimped form, for example, as shown by the foil 90 in FIG. 18, whereby the low ductility of the foil is offset to some extent. Additionally, the desired expansion reserve of the foil material may be achieved by pre-gathering or pre-crimping a flat foil strip prior to the stamping operations, manually or by any known foil crimping, creasing, or gathering device, as will be appreciated by the artisan.

Figure 19:
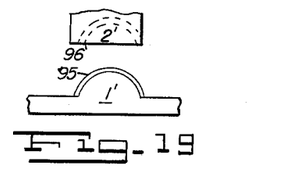
FIG. 19 is a schematic partial view of an alternate embodiment of the mold arrangement in which a thin layer of plastic coating is present on the mold surfaces to minimize friction and binding of the foil being impressed.

The stamping dies 1' and 2' as shown in FIG. 19 may be covered suitably with a layer 95, 96, respectively, of thermoplastic film such as polyvinylchloride or polystyrene so that friction will be minimized without deformation of the thermoplastic film due to the strain of the stamping operation.

The welding of the edges of the foil mold halves may be suitably carried out with polyvinyl dichloride or polyethylene.

Using the device of FIGS. 1-6, an aluminum foil strip i.e., of 0.015 mm. to 0.03 mm. thickness is placed over the preliminary patrix mold 1 and impressed along its forward portion by the rearward portion with matrix mold 4, and then along its remaining portion with matrix mold 2 while mold 4 is still in impressing position. Molds 2 and 4 are withdrawn, and the shell formed in this manner is then placed on patrix 11, and mold 4 downwardly displaced once more to impart a finished shape to the shell and simultaneously a preliminary shape to the forward portion of the next area now disposed over patrix 1. A pressing force of 15 kg./cm.$^2$ is used for molds 2 and 4, and the finished shell obtained is free from tears or ruptures.

It is pointed out with particular emphasis that the initial presence of folds and the permitting of folds to develop during the mold impressing and even the positive steps of folding and creasing the foil during the initial impressing by the step-wise mold impressing technique, is most desirable in accordance with the invention, in contrast to all prior art molding techniques and operations using metal plates, sheets, foils, etc., wherein the furtherance of folds in the foils or sheets has always been avoided, and every effort made to suppress folds or creases of any kind in the foils, sheets, or plates. It is only by such deformation, i.e., folding, creasing, gathering, wrinkling, etc. of the low ductility, thin metal foil that the successful tear-free production of figurine molds is made possible in accordance with the present invention.

What is claimed is:

1. Process for the step-wise manufacture of figurine molds from shapable foil material of low ductility for the reception of moldable ingredients therein with the foil molds serving as packaging for said ingredients, which comprises initially impressing a preliminary shape into a first portion of one area of the foil material to be mold-impressed with respect to the plane of the foil while sufficiently feeding the foil material during the impressing to cause attendant gathering and creasing of said first portion of such area during such impressing, next initially impressing a preliminary shape into the remaining portion of said area of the foil material in at least one additional impressing step while suffiicently feeding the foil material during the impressing to cause attendant gathering and creasing of said remaining portion of such foil area during such impressing and while maintaining the first portion in fixed preliminary shape disposition, and subsequently impressing a finished shape into both of the foil portions in at least one additional impressing step using the expansion reserve in the foil material provided by such gathering and creasing in the initial impressing steps, the impressing steps being carried out in successive phase ordinal sequence.

2. Process according to claim 1 wherein said foil material is pregathered aluminum foil, whereby further gathering and creasing of the foil portions takes place during the initial impressing steps to provide greater expansion reserve in the foil for the subsequent impressing of a finished shape in said foil portions.

3. Process according to claim 1 wherein said foil material is conveyed along a path of travel, said first portion being the forward portion of said area of the foil material in the direction of travel and said remaining portion being the rearward portion of said area of the foil material, the initial impressing of the preliminary shape into said remaining portion and the subsequent impressing of the finished shape into both of the foil portions being each carried out in a single impressing step.

4. Process according to claim 3 wherein two correspondingly congruent finished shape mold areas are placed in opposing abutting disposition along their adjacent edge portions to form a pair of fillable mold halves, a moldable chocolate ingredient being introduced therebetween, and said edge portions being thereafter sealably connected to form a seam therealong.

5. Process according to claim 4 wherein said edge portions are sealably connected by welding.

6. Process according to claim 4 wherein said edge portions are sealably connected by mechanical crimping together thereof in tight abutment.

7. Process according to claim 4 wherein said mold areas are simultaneously severed from the corresponding foil material by punching out the filled mold halves along the edge portions thereof leaving a pre-determined width seam serving as a safety flange for the resulting foil packaging of the filled ingredient.

8. Process according to claim 7 wherein the perimeter outline of the resulting packaging is calibrated by passing the packaging along a calibration path in a plane perpendicular to the direction of such calibration path and through an outwardly limiting perimeter abutment zone for inwardly pressing the safety flange towards the center of said packaging during passage of the packaging therethrough.

9. Process for the continuous step-wise manufacture of figurine molds from shapable metallic foil material of low ductility in the form of a strip for the reception of moldable ingredients therein with the molds serving as packaging for said ingredients so as to form a filled ingredient packaged article, which comprises passing the strip in the form of a pregathered and precreased metallic foil material along a path of travel through two successive impressing zones, initially impressing in a first of said zones a preliminary three-dimensional shape into the forward portion in the direction of travel of the area of the strip to be mold-impressed with sufficient feeding of the strip during the impressing to cause further attendant gathering and creasing of said forward portion of such area during such impressing, next initially impressing in the first zone a preliminary three-dimensional shape into the remaining rearward portion of the area of the strip to be mold-impressed with sufficient feeding of the strip during the impressing to cause further attendant gathering and creasing of said rearward portion of such area during such impressing while maintaining the forward portion in fixed preliminary three-dimensional shape disposition in said first zone, subsequently impressing a finished three-dimensional shape into both of the foil portions in an additional impressing step in the second of said zones using the expansion reserve in the pregathered and precreased foil and the additional expansion reserve provided by said gathering and creasing in the first of said zones while simultaneously initially impressing in said first zone a preliminary three-dimensional shape into the forward portion in said direction of travel of the next area of the strip to be mold-impressed with sufficient feeding of the strip during the impressing to cause further attendant gathering and creasing of said forward portion of such next area during such impressing, and repeating the impressing steps at least one more time, the impressing steps being carried out in successive phase ordinal sequence in said zones.

10. Process for the continuous step-wise manufacture of figuring molds from very thin, shapable metallic foil material of low ductility in the form of a strip for the reception of moldable ingredients therein with opposing mold halves serving as packaging for said ingredients so as to form a filled ingredient packaged article, which comprises passing two opposing strips through separate paths of travel, each strip being passed along its corresponding path through two successive impressing zones for producing mold halves of congruent opposed shape to the shape of the mold halves produced in the other strip, and with respect to each strip initially impressing in a first of said zones preliminary three-dimensional shaping into the forward portion in the direction of travel of a first area of the strip to be mold-impressed with sufficient feeding of the strip during the impressing to cause attendant gathering of said forward portion of such first area during such impressing, next initially impressing in the first zone preliminary three-dimensional shaping into the remaining rearward portion of the said first area of the strip to be mold-impressed with sufficient feeding of the strip during the impressing to cause attendant gathering of said rearward portion of such first area during such impressing while maintaining the forward portion in fixed preliminary three-dimensional shaped disposition in said first zone, thereafter passing said first area to the second of said zones and a second successive area of the strip to be mold-impressed to said first zone and impressing finished three-dimensional shaping into the preliminary shaped foil portions of said first area in an additional impressing step in said second zone using the expansion reserve in the foil provided by said gathering in the first of said zones while simultaneously initially impressing in said first zone preliminary three-dimensional shaping into the forward portion in said direction of travel of said second successive area with sufficient feeding of the strip during the impressing to cause attendant gathering of said forward portion of such second successive area during such impressing, then initially impressing in said first zone preliminary three-dimensional shaping into the remaining rearward portion of said second successive area of the strip with sufficient feeding of the strip during the impressing to cause attendant gathering of said rearward portion of such second successive area during such impressing while maintaining the forward portion of such second successive strip area in fixed preliminary three-dimensional shaped disposition in said first zone and the foil portions of said first area in fixed finished three-dimensional shape in said second zone, then passing said first area from said second zone and said second area to said second zone and a third successive area of the strip to be mold-impressed to said first zone and subsequently impressing finished three-dimensional shaping into the preliminary shaped foil portions of said second area in said second zone using the expansion reserve in the foil provided by said gathering in the first of said zones while simultaneously initially impressing in said first zone preliminary three-dimensional shaping into the forward portion in said direction of travel of said third successive area with sufficient feeding of the strip during the impressing to cause attendant gathering of said forward portion of such third successive area during such impressing, then initially impressing in said first zone preliminary three-dimensional shaping into the remaining rearward portion of said third successive area of the strip with sufficient feeding of the strip during the impressing to cause attendant gathering of said rearward portion of such third successive area during such impressing while maintaining the forward portion of such third successive strip area in fixed preliminary three-dimensional shape disposition in said first zone and the foil portions of said second area in fixed finished three-dimensional shape in said second zone, repeating the steps in said zones at least one more time with at least one more successive area of the strip, placing at least one congruent finished mold shaping in each strip in correspondingly opposing abutting disposition along their adjacent edge portions to form opposing fillable mold halves, introducing at least one moldable ingredient therebetween, thereupon sealably connecting said edge portions to form a seam therealong and thereafter simultaneously severing said edge portions from the corresponding foil strip by punching out the filled mold halves along the edge portions thereof leaving a predetermined width seam serving as a safety flange for the resulting foil packaging of the filled ingredient, subsequently calibrating the perimeter outline of the resulting packaging by passing the packaging along a calibration path in a plane perpendicular to the direction of such calibration path and through an outwardly limiting perimeter abutment zone for inwardly pressing the safety flange towards the center of said packaging during passage of the packaging therethrough.

11. Die stamping apparatus for producing mold halves from shapable foil material of low ductility for the reception of moldable ingredients therein with the foil molds serving as packaging for said ingredients which comprises a first support means having adjacently disposed preliminary shape patrix mold means and corresponding finished shape patrix mold means, a second support means having complementary first preliminary shape partial matrix mold means for operatively engaging a first completely contiguous area of shapable foil material disposed over part of said preliminary patrix mold means and a third support means having adjacently disposed complementary second preliminary shape partial matrix mold means for operatively engaging an adjacent second completely contiguous area of shapable foil material disposed over the remaining part of said preliminary patrix mold means and complementary finished shape matrix mold means for operatively engaging together two combined adjacent areas of preliminary shaped foil material previously operatively engaged respectively by said first and second partial matrix mold means disposed over said finished shape patrix mold means, said first and second support means being situated with respect to each other for relative displacement from a position out of foil engaging contact to a position in foil engaging contact with one another to coact said first preliminary partial matrix mold means with said part of said preliminary patrix mold means for preliminary mold-impressing said first area of shapable foil material therebetween to impart to such first area of shapable foil material an initial, roughly impressed preliminary three-dimensional shaping with gathering of the foil material in said first area, and said first and third support means being situated with respect to each other for relative displacement from a position out of foil engaging contact to a position into foil engaging contact with each other to coact said second preliminary partial matrix mold means with said remaining part of said preliminary patrix mold means for preliminary mold-impressing therebetween of said second area of the shapable foil material disposed over the remaining part of said preliminary patrix mold means to impart to such second area of shapable foil material an initial, roughly impressed preliminary three-dimensional shaping with gathering of the foil material in said second area and said finished matrix mold means with said finished patrix mold means for finished mold-impressing of said combined areas of preliminary shaped foil material therebetween to impart to such first and second areas of shapable foil material already provided with an initial, roughly impressed preliminary three-dimensional shaping a finished three-dimensional shaping using the expansion reserve of such gathering in the foil material for this purpose, said second and third support means being situated for displacement with respect to said first support means independently of each other, yet with said first and second preliminary partial matrices being situated in displaceable cooperating abutting relation and together defining the entire complementary composite matrix mold means for said preliminary patrix mold means, the profile line of separation between said first and second preliminary partial matrices being defined along the line of maximum height of the preliminary patrix mold means, with said first and second preliminary partial matrices each defining about half of the composite matrix mold means, and all of said matrix mold means being provided with a smooth plastic lining capable of withstanding the impressing forces for mold-impressing shapable foil material of low ductility.

12. Process according to claim 1, wherein the profile line of separation between said first portion and remaining portion of such foil area is situated along the line of maximum height of the combined preliminary mold shape being impressed into said area of the foil material.

References Cited by the Examiner

UNITED STATES PATENTS

| | | | |
|---|---|---|---|
| 1,841,920 | 1/1932 | Smith. | |
| 2,032,365 | 3/1936 | Karmazin. | |
| 2,272,255 | 2/1942 | Vergobbi | 93—12 |
| 2,397,832 | 4/1946 | Borton. | |
| 2,456,506 | 12/1948 | Henchert | 113—49 X |
| 2,627,709 | 2/1953 | Schlicksupp | 53—226 X |
| 2,689,539 | 9/1954 | Lyon | 113—49 |
| 2,830,417 | 4/1958 | Ullman et al. | 53—226 |

FOREIGN PATENTS

| | | |
|---|---|---|
| 150,762 | 2/1932 | Switzerland. |
| 277,932 | 12/1951 | Switzerland. |

IRVING BUNEVICH, *Primary Examiner.*

JOSEPH D. BEIN, ROBERT E. PULFREY, WALTER A. SCHEEL, *Examiners.*

JOSEPH SHEA, *Assistant Examiner.*